(12) United States Patent
Shi et al.

(10) Patent No.: US 10,536,567 B2
(45) Date of Patent: Jan. 14, 2020

(54) TERMINAL DEVICE AND ELECTRONIC DEVICE

(71) Applicant: SHENZHEN ROYOLE TECHNOLOGIES CO. LTD., Shenzhen, Guangdong (CN)

(72) Inventors: Yijun Shi, Guangdong (CN); Qi Lin, Guangdong (CN); Jianlei Zhu, Guangdong (CN); Xin Chen, Guangdong (CN); Ji Wang, Guangdong (CN)

(73) Assignee: SHENZHEN ROYOLE TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/744,975

(22) PCT Filed: Dec. 31, 2015

(86) PCT No.: PCT/CN2015/100156
§ 371 (c)(1),
(2) Date: Jan. 15, 2018

(87) PCT Pub. No.: WO2017/113311
PCT Pub. Date: Jul. 6, 2017

(65) Prior Publication Data
US 2018/0213072 A1 Jul. 26, 2018

(51) Int. Cl.
*H04M 1/02* (2006.01)
*H04M 1/04* (2006.01)
(Continued)

(52) U.S. Cl.
CPC ....... *H04M 1/0277* (2013.01); *H04M 1/0262* (2013.01); *H04M 1/04* (2013.01);
(Continued)

(58) Field of Classification Search
CPC .... H04M 1/0277; H04M 1/0262; H04M 1/03; H04M 1/04; H04M 1/22; H04M 1/0268;
(Continued)

(56) References Cited

U.S. PATENT DOCUMENTS

| | | | | |
|---|---|---|---|---|
| 2008/0163663 | A1* | 7/2008 | Hankey | B21C 23/18 72/348 |
| 2011/0049094 | A1* | 3/2011 | Wu | G06F 3/0202 216/36 |

(Continued)

FOREIGN PATENT DOCUMENTS

| | | |
|---|---|---|
| CN | 2919719 Y | 7/2007 |
| CN | 201303366 Y | 9/2009 |

(Continued)

OTHER PUBLICATIONS

The English Translation of Description CN 101715032 (Year: 2019).*

(Continued)

*Primary Examiner* — Tuan D Nguyen
(74) *Attorney, Agent, or Firm* — Hauptman Ham, LLP (57) ABSTRACT

A terminal device includes a main body and a flexible touch panel. The main body includes a substrate, an earphone assembly, and a microphone assembly. The earphone assembly and the microphone assembly are respectively set on two opposite ends of the substrate. The flexible touch panel is on the substrate. The flexible touch panel is between the earphone assembly and the microphone assembly. The flexible touch panel is set on the substrate, to realize the touch and control function during using by a user. The whole substrate is thin, and the earphone assembly and the microphone assembly are set respectively on both ends of the substrate, communication may be realized simultaneously, the whole structural compactness of the terminal device may also be (Continued)

improved, and the whole thickness of the terminal device may be reduced.

20 Claims, 9 Drawing Sheets (51) Int. Cl.
*H04M 1/22* (2006.01)
*G06F 3/041* (2006.01)
*H02J 7/00* (2006.01)
*H02J 7/02* (2016.01)

(52) U.S. Cl.
CPC ............... *H04M 1/22* (2013.01); *G06F 3/041* (2013.01); *G06F 2203/04102* (2013.01); *H02J 7/0044* (2013.01); *H02J 7/025* (2013.01); *H04M 1/0279* (2013.01); *H04M 2250/02* (2013.01)

(58) Field of Classification Search
CPC ............ H04M 1/0279; H04M 2250/02; G06F 1/1626; G06F 3/016; G06F 3/041; G06F 2203/04102; H02J 7/0044; H02J 7/025
See application file for complete search history.

(56) References Cited

U.S. PATENT DOCUMENTS

| | | | | |
|---|---|---|---|---|
| 2011/0124371 | A1* | 5/2011 | Li | H04M 1/02 455/556.1 |
| 2013/0194207 | A1 | 8/2013 | Andrew et al. | |
| 2014/0354587 | A1* | 12/2014 | Mohindra | G06F 3/044 345/174 |
| 2015/0162767 | A1 | 6/2015 | Oh et al. | |
| 2015/0215446 | A1* | 7/2015 | Fujimoto | H04M 1/56 455/566 |
| 2016/0110010 | A1* | 4/2016 | Lee | G06F 1/1624 345/173 |

FOREIGN PATENT DOCUMENTS

| | | |
|---|---|---|
| CN | 101715032 A | 5/2010 |
| CN | 201515405 U | 6/2010 |
| CN | 203014890 U | 6/2013 |
| JP | H0221760 A | 1/1990 |
| JP | H0422244 A | 1/1992 |
| JP | H06224816 A | 8/1994 |
| JP | 2001007905 A | 1/2001 |
| JP | 2008306244 A | 12/2008 |
| JP | 2010044794 A | 2/2010 |
| JP | 2012064736 A | 3/2012 |
| JP | 2013239900 A | 11/2013 |

OTHER PUBLICATIONS

International search report issued in corresponding PCT application No. PCT/CN2015/100156 dated Sep. 18, 2016.

* cited by examiner

TERMINAL DEVICE AND ELECTRONIC DEVICE

RELATED APPLICATIONS

The present application is a National Phase of International Application Number PCT/CN2015/100156, filed Dec. 31, 2015.

TECHNICAL FIELD

The application relates to the field of communication electronic products, more particularly relates to a terminal device and an electronic device.

BACKGROUND

A whole structure of a home phone of the related art is bulky. Take a telephone as an example, which usually uses a plastic shell, and then plastic buttons are set on an upper part of the plastic housing for making a call by pressing numbers.

However, because the plastic button is a mechanical button with a complicated structure, the plastic button may be damaged easily when being used, which causes a malfunction of the button and affects a normal use of the telephone.

SUMMARY

In view of the above problems of the related art, the present application provides a terminal device with high use reliability.

In addition, the present application also provides an electronic device incorporating the terminal device.

In order to realize the above purpose, the embodiments of the present application provide the following technical solutions:

In a first aspect, the present application provides a terminal device, where the terminal device includes a main body and a flexible touch panel, the main body includes a substrate, an earphone assembly, and a microphone assembly, the earphone assembly and the microphone assembly are respectively set on the substrate, and the earphone assembly is set opposite to the microphone assembly, the flexible touch panel is set on the substrate, and the flexible touch panel is located between the earphone assembly and the microphone assembly.

In a second aspect, the present application further provides an electronic device, the electronic device includes a pedestal and the abovementioned terminal device, and the terminal device is located on the pedestal.

The present application provides a terminal device and an electronic device. The flexible touch panel is set on the substrate, to realize the touch and control function during using by a user, so that a means using mechanical buttons of the related art may be replaced, a problem causing damage that the buttons are pressed in a long term can be avoided, and the reliability of the terminal device may be greatly improved. At the same time, because the whole substrate is thin, and the earphone assembly and the microphone assembly are set respectively on both ends of the substrate, the communication may be realized simultaneously, the whole structural compactness of the terminal device may also be improved, and the whole thickness of the terminal device may be reduced.

BRIEF DESCRIPTION OF THE DRAWINGS

In order to describe the embodiments of the present application or the technical solutions in related art more clearly, accompanying drawings required for describing the embodiments or the related art will be briefly introduces. Apparently, the accompanying drawings in the following description are merely the embodiments of the present application, and other drawings may be obtained by those skilled in the art according to these accompanying drawings without paying any creative labor.

DETAILED DESCRIPTION

The technical solutions in the embodiments of the present application will be described clearly and completely hereinafter with reference to the accompanying drawings in the embodiments of the present application. Apparently, the described embodiments are merely a part but not all embodiments of the present application. All other embodiments obtained by those skilled in the art based on the embodiments of the present application without paying any creative labor shall fall in the protecting scope of the present application.

For ease of description, spatial relative terms, for example, "under", "below", "down", "above", "on", or the like, may be described a relationship between one element or feature and another element or feature as shown in the figures. It should be noted that when one element or layer is referred as being "on" another element or layer, or being "connected with" or "coupled to" another element or layer, it may be directly on the other element or layer, directly be connected or coupled to another element or layer, or may be present an intervening element or layer.

It should be understood that the terms used herein is for the purpose of describing particular embodiments only, and is not intended to limit the application. As used herein, the singular forms "a" and "the" are intended to include the plural forms as well, unless the context clearly indicates otherwise. Furthermore, the terms "include" and/or "comprise" when used in this specification indicate the presence of stated features, integers, steps, elements, and/or components, but do not preclude the presence or addition of one or more other features, integers, presence, or addition of steps, elements, components, and/or groups thereof. Described later in the specification is a preferred embodiment for carrying out the present application. However, the description is for the purpose illustrating the general principles of the present application, and the description is not intended to limit the scope of the present application. The scope of the present application should be defined by the appended claims.

Figure 1:
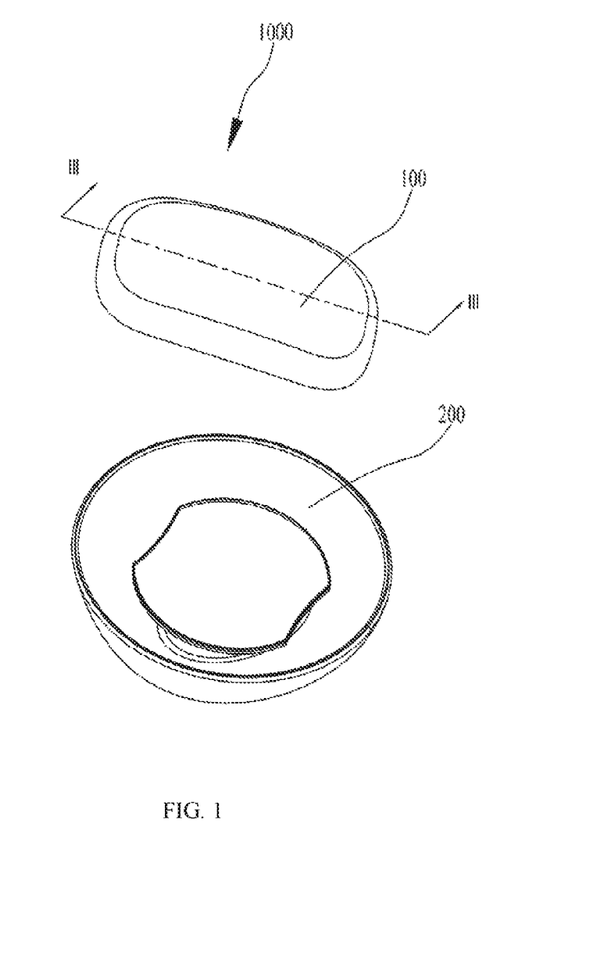
FIG. 1 is a structural schematic view of an electronic device provided by an embodiment of the present application.

As shown in FIG. 1, an electronic device 1000 is provided by the embodiment of the present application, the electronic device 1000 includes a terminal device 100 and a pedestal 200, and the terminal device 100 is located on the pedestal 200.

In the embodiment of the present invention, the electronic device 1000 may be, but is not limited to, a telephone, a mobile phone, or other electronic devices. In the embodiment, the electronic device 1000 is configured as the telephone for illustration.

As shown in FIGS. 2 to 7, which are structural schematic views of the electronic device 100 provided by one embodiment of the present application. The terminal device 100 includes a main body 1 and a flexible touch panel 2. The main body 1 includes a substrate 11, an earphone assembly 12, and a microphone assembly 13. The earphone assembly 12 and the microphone assembly 13 are respectively set on the substrate 11, and the earphone assembly 12 is set opposite to the microphone assembly 13. The flexible touch panel 2 is set on a surface of the substrate 11, and located between the earphone assembly 12 and the microphone assembly 13.

Figure 2:
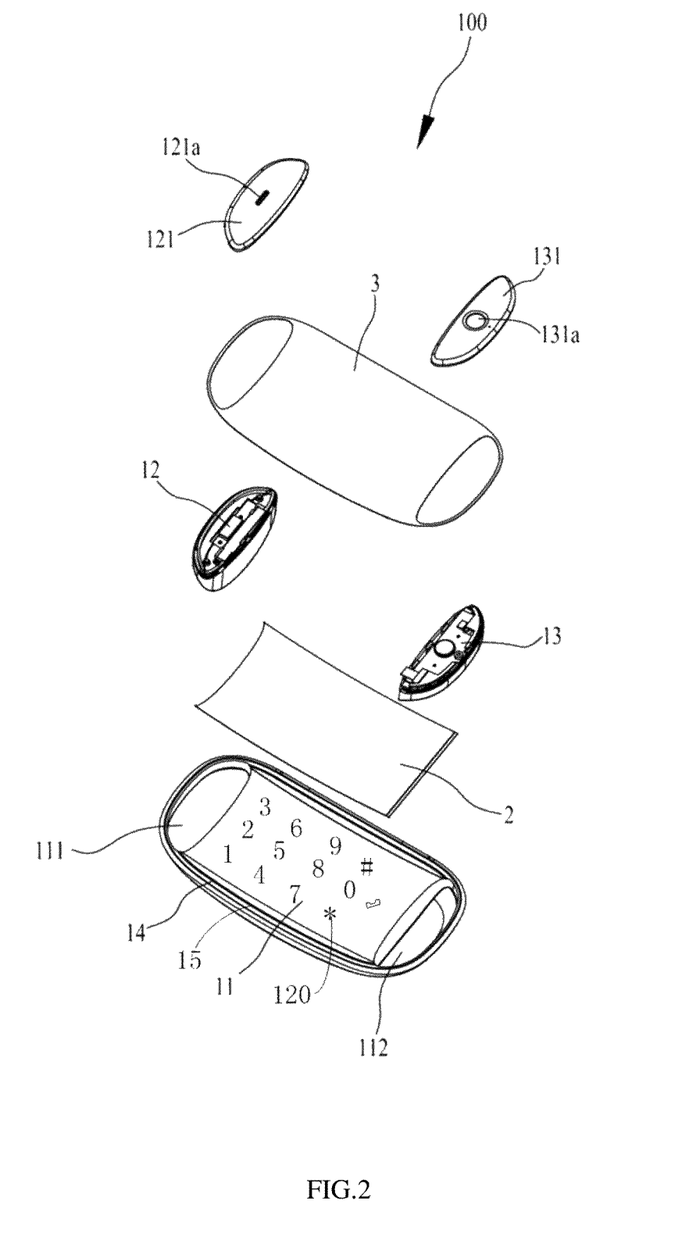
FIG. 2 is an exploded schematic view of a terminal device provided by an embodiment of the present application.
Figure 3:
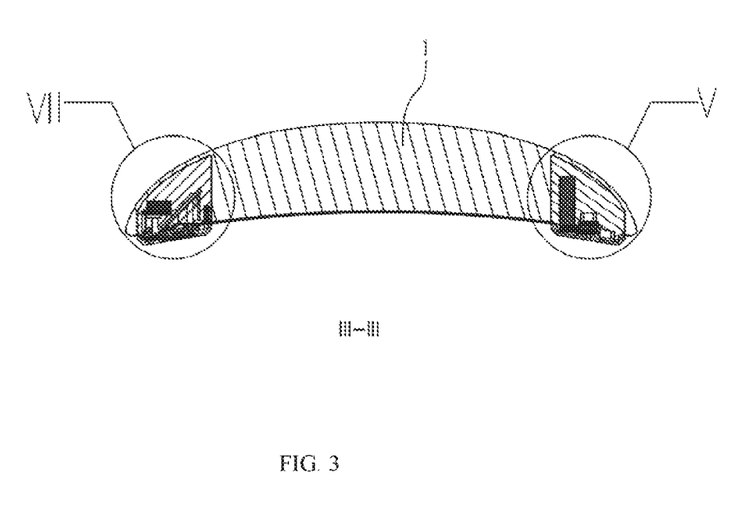
FIG. 3 is a cross-sectional view of the terminal device of FIG. 1, taken along the line of III-III.

Specifically, an earphone cavity 111 and a microphone cavity 112 opposite to the earphone cavity 111 are defined in the substrate 11. The earphone assembly 12 and the microphone assembly 13 are set in the earphone cavity 111 and the microphone cavity 112, respectively. The earphone assembly 12 includes an earphone cover 121 covering the earphone cavity 111 and enclosing an opening of the earphone cavity 111. The microphone assembly 13 includes a microphone cover 131 set on the microphone cavity 112 and enclosing an opening of the microphone cavity 112. The opening of the earphone cavity 111 and the opening of the microphone cavity 112 are enclosed by the earphone cover 121 and the microphone cover 131, thus to prevent dust or debris from entering the earphone cavity 111 and the microphone cavity 112, and facilitate to clean.

In the embodiment, the substrate 11 is integrally made from a monolithic piece of transparent material. Specifically, the material of the substrate 11 may be selected as acrylic and integrally molded, to ensure the transparency of the substrate 11 and facilitate the processing of the substrate 11. In addition, the substrate 11 adopts the acrylic material, so that the terminal device 100 may be light and portable. In order to further improve an appearance and decorative effect of the terminal device 100, the substrate 11 may be substantially an arc-shaped block structure, and edges of the substrate 11 may be transitioned in a rounded corner. The design of the arc-shaped block structure enables the substrate 11 to be more in line with an ergonomic design, which is easy for user to hold. Meanwhile, the edge of the substrate is adopted as the rounded corner to further improve the comfort of the user's holding. Preferably, a cross-sectional shape of the substrate 11 is substantially a semi-moon shape to further ensure the good appearance and decorative effect of the substrate 11, and there is enough space to define the earphone cavity 111 and the microphone cavity 112.

For further improvement, dialing numerals 120 are set on a surface of the substrate 11, so that the user may see the dialing numerals 120 through the flexible touch panel 2, and thereby realizing a communication function via dialing, and other functions. In the embodiment, the dialing numerals 120 are set on the surface of the substrate 11 by a laser engraving to ensure a service life and a good decorative effect thereof. In addition, the dialing numerals 120 are set on the substrate 11 by a mode of laser engraving, so that the appearance of the substrate 11 has an embossed effect, and further enhances the whole decorative effect of the terminal device 100. It should be understood that, in other embodiments, the dialing numerals 120 may also be integrally formed on the surface of the substrate 11 when the substrate 11 is molded.

In the embodiment, the earphone cavity 111 may be substantially an arc-shaped cavity defined on an end of the substrate 11. The microphone cavity 112 may be substantially an arc-shaped cavity defined on an end of the substrate 11 away from the earphone cavity 111, to maintain the whole appearance of the substrate 11.

As shown in FIGS. 2, 3, 4, and 5, the earphone assembly 12 further includes a first housing 122, a battery 123, a bracket 124, a first circuit board 125 and a speaker 126. The first housing 122 defines a battery compartment 122a. The battery 123 is received in the battery compartment 122a. In the embodiment, the first housing 122 is substantially an arc-shaped housing corresponding to a shape of the earphone cavity 111. Because the volume of the earphone cavity 111 is small, the volume of the first housing 122 is also small. The battery compartment 122a is set on one side of the first housing 122, and the battery compartment 122a is substantially a square cavity, thus to facilitate the placement of the battery 123. It should be understood that, in other embodiments, the appearance of the first housing 122 may also be adjusted according to the shape of the earphone cavity 111. For example, when the earphone cavity 111 is substantially a square cavity, the first housing 122 may be substantially a square housing.

Figure 4:
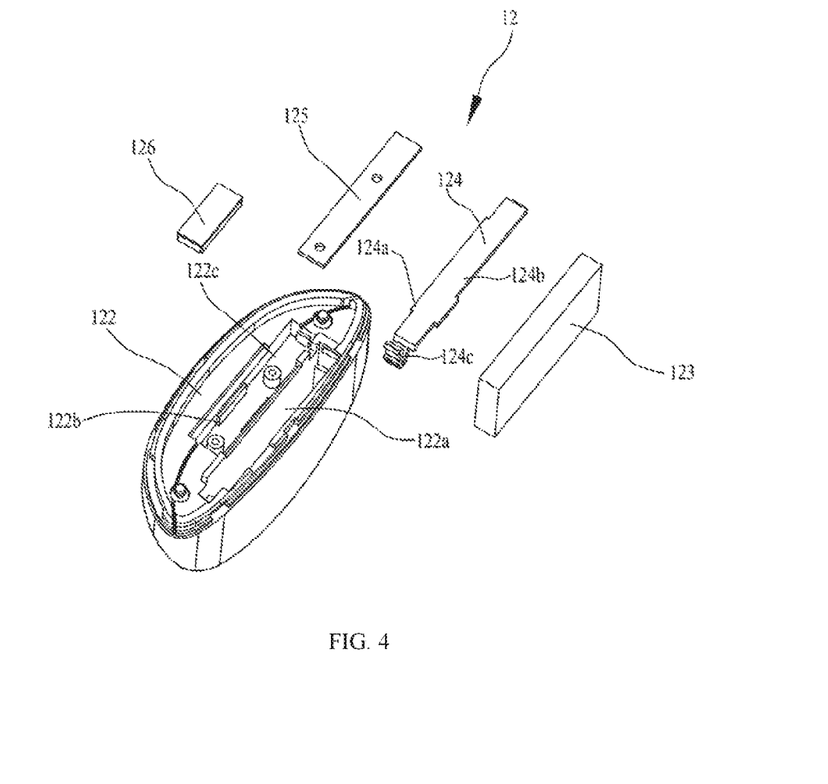
FIG. 4 is an exploded schematic view of an earphone assembly provided by an embodiment of the present application.
Figure 5:
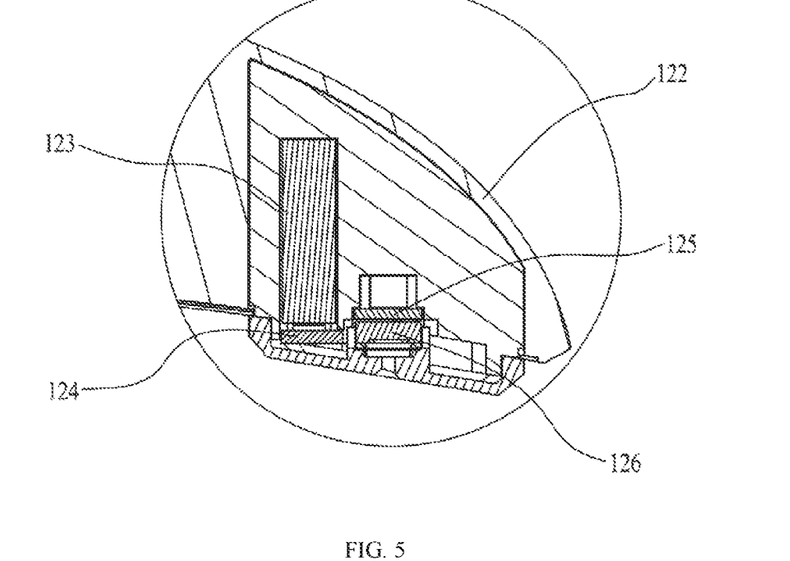
FIG. 5 is an enlarged view of a circled portion V of FIG. 3.

For further improvement, in the embodiment, the bracket 124 is detachably connected to the battery compartment 122a, and the bracket 124 encloses an opening of the battery compartment 122a to prevent dust or debris from entering the battery compartment 122a to resolve an inconvenient cleaning problem. In addition, because the bracket 124 is detachably connected to the battery compartment 122a, the battery compartment 122a can be easily opened at any time for placing, replacing or checking the battery 123. Specifically, edges of the battery compartment 122a set a plurality of grooves (not shown). A plurality of protrusions 124a are set on edges of the bracket 124 corresponding to the plurality of grooves. The plurality of protrusions 124a are buckled in the plurality of grooves, thus to facilitate the connection between the bracket 124 and the battery compartment 122a. Applying the buckle connection, the bracket 124 can be easily detached, and the bracket 124 can completely enclose the opening of the battery compartment 122a. It should be understood that, in other embodiments, the bracket 124 may also be connected to the battery compartment 122a by other manners. For example, one end of the bracket 124 may be rotatably connected to the battery compartment 122a, and the other end may be fixed on the battery compartment 122a by a screw, or the other end may also be provided with a protrusion, then a slot is provided at a corresponding end of the battery compartment 122a, and the protrusion is engaged in the slot, therefore a connection between the bracket 124 and the battery compartment 122a may be also realized.

Furthermore, the bracket 124 includes a cover plate 124b and an elastic abutting portion 124c formed at one end of the cover plate 124b. The cover plate 124b is clamped on the edge of the opening of the battery compartment 122a and abuts an end surface of the battery 123 received in the battery compartment 122*a* to prevent the battery 123 from falling off the battery compartment 122*a*. The elastic abutting portion 124*c* is substantially U-shaped, and bent down and then up from one end of the cover plate 124*b*. The elastic abutting portion 124*c* elastically abuts a side surface of the battery 123 adjacent to the end surface thereof to further fix the battery 123 and prevent the battery 123 from swaying in the battery compartment 122*a*. Because the elastic abutting portion 124*c* has elasticity, a better stabilizing effect can be obtained.

The first circuit board 125 is set in the first housing 122, and the first circuit board 125 is electrically connected with the battery 123. In the embodiment, in order to make the whole structure of the earphone assembly 12 be more compact, the first circuit board 125 is set at one side of the battery compartment 122*a* to save a routing space between the first circuit board 125 and the battery 123. Specifically, a supporting platform 122*b* is set in the first housing 122. The supporting platform 122*b* and the battery compartment 122*a* are set side by side. The first circuit board 125 is fixed on the supporting platform 122*b*. Preferably, because the first circuit board 125 is substantially a square plate structure, thus to facilitate the fixing of the first circuit board 125, a slot 122*c* is set in the first housing 122, and the supporting platform 122*b* is a step extending on an inner wall of the slot 122*c*. It should be understood that, in other embodiments, the first circuit board 125 may also be directly fixed on the bracket 124 to further save the routing space of the first circuit board 125 and the battery 123.

The speaker 126 is set on the first circuit board 125 and electrically connected with the first circuit board 125. In the embodiment, two pins (not shown) are set on the speaker 126, and both of the two pins are a metal elastic piece. The two pins are electrically connected with corresponding pins of the first circuit board 125 to realize the electrical connection between the speaker 126 and the first circuit board 125. Adopting the design that the speaker 126 is directly set on the first circuit board 125, the space occupied by the first housing 122 can be saved, and the pins of the speaker 126 can also be directly abutted against the first circuit board 125, so that the speaker 126 is connected with the first circuit board 125 more tightly, to prevent the speaker 126 from separating the first circuit board 125 when being used which may cause a problem of poor call effect, and thereby ensuring the reliability of the earphone assembly 12. Specifically, one surface of the first circuit board 125 abuts against the supporting platform 122*b*, and the opposite surface is connected with the speaker 126. Therefore, the speaker 126 is substantially at the same height as the bracket 124. In other words, the speaker 126 and the bracket 124 are set side by side.

The earphone cover 121 is detachably set on the earphone cavity 111. In the embodiment, the earphone cover 121 is substantially an arc-shaped plate, which corresponds to the shape of the earphone cavity 111, and the earphone cover 121 is substantially an opaque plate to shelter the components in the earphone cavity 111. Preferably, in order to correspond to the substrate 11 and make the whole appearance of the main body 1 be better, the earphone cover 121 may be made of white plastic or coated with a white layer on a surface of the earphone cover 121. The earphone cover 121 may be connected to the earphone cavity 111 by a screw, thus to ensure a tight connection between the earphone cover 121 and the earphone cavity 111, and prevent the earphone cover 121 from separating from the earphone cavity 111, causing debris, dust, or the like to enter the earphone cavity 111, and thereby causing a malfunction of the speaker 126 and the first circuit board 125.

Furthermore, the earphone cover 121 defines a plurality of sounding holes 121*a*, which are sequentially set, to ensure the speaker 126 being capable of transmitting the sound for a user to hear. Specifically, each of the plurality of sounding holes 121*a* is set at a position of the earphone cover 121 corresponding to the speaker 126 to ensure the sounding effect. Preferably, each of the plurality of sounding holes 121*a* has a filter (not shown) to prevent dust or debris from blocking the sounding holes 121*a* and causing a poor sounding effect. At the same time, the filter is designed in the sounding hole 121*a*, therefore the dust particles and the like may also be prevented from entering the speaker 126 and the first circuit board 125 through the sounding holes 121*a*, to ensure the use reliability of elements of the first circuit board 125 and the speaker 126.

Referring to FIGS. 2, 3, 6, and 7, the microphone assembly 13 further includes a second housing 132, a second circuit board 133, a microphone 134 and a plurality of LED lights 135. The second circuit board 133 is fixed in the second housing 132. In the embodiment, the second housing 132 is substantially an arc housing, and the second housing 132 corresponds to a shape of the microphone cavity 112. The second circuit board 133 is substantially a square plate structure, and the second circuit board 133 is preferably fixed in the second housing 132 through screws. Specifically, the second circuit board 133 defines a plurality of screw holes (not shown) for the screws passing through, the second housing 132 includes a plurality of studs (not shown), the screws pass through the screw holes and holes of the studs, therefore the circuit board 133 may be fixed in the second housing 132. An inner portion of the second housing 132 forms a plurality of bracing bars 132*a*, which are vertically extended and adjacent to the second circuit board 133. The first circuit board 125 is placed horizontally, and the second circuit board 133 is placed inclinedly relative to the first circuit board 125. In particular, the second circuit board 133 is inclined towards the microphone cover 131 along a direction far away from the earphone cavity 111.

Figure 6:
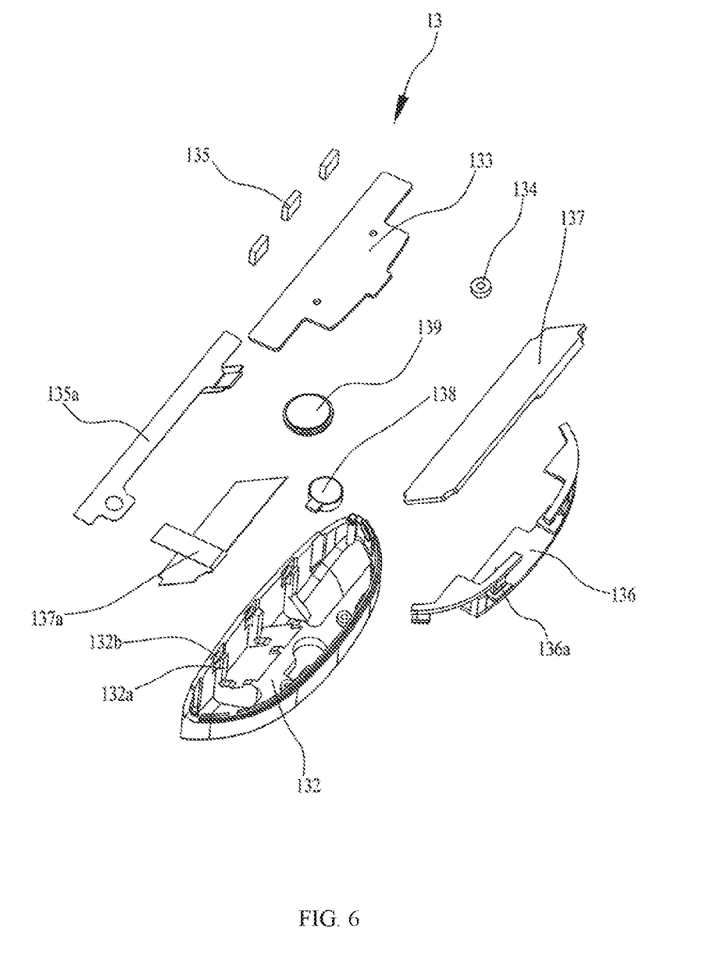
FIG. 6 is an exploded schematic view of a microphone assembly provided by an embodiment of the present application.
Figure 7:
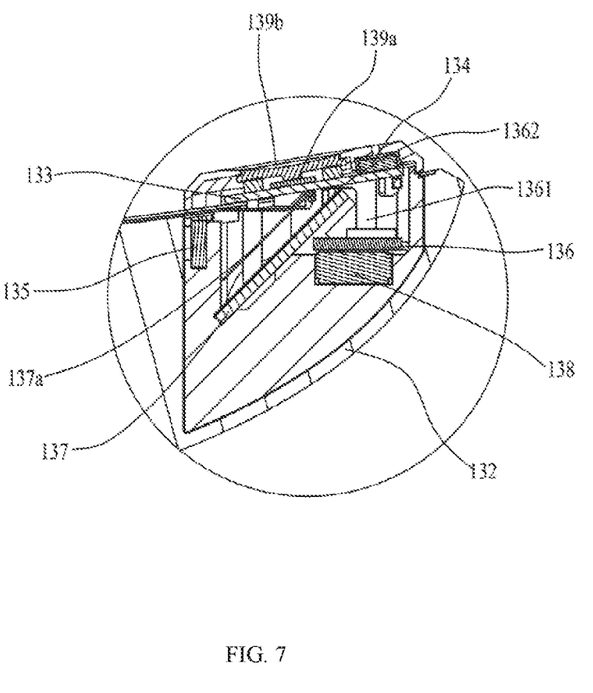
FIG. 7 is a partially inverted, enlarged view of a circled portion VII of FIG. 3.

The microphone 134 is set on the second circuit board 133, and the microphone 134 is electrically connected with the second circuit board 133, to realize the electrical conduction of the microphone 134. In the embodiment, the microphone 134 may be electrically connected with the second circuit board 133 through a connecting wire, or may be connected with the second circuit board 133 by pins set on the microphone 134. The microphone 134 is mounted on a surface of the second circuit board 133 facing towards the microphone cover 131.

The plurality of LED lights 135 are set side by side in the second housing 132, and the plurality of LED lights 135 are electrically connected with the second circuit board 133. The plurality of LED lights 135 are sandwiched between the bracing bars 132*a* and an inner wall of the second housing 132, thus to realize a positioning function. In the embodiment, the plurality of LED lights 135 are electrically connected with the second circuit board 133 through a bent flexible circuit board 135*a*. Of course, the LED light 135 may also be set on an aluminum substrate, and then the aluminum substrate is fixed in the second housing 132. In addition, in order to save an inner space of the second housing 132, the plurality of LED lights 135 may be directly set on the second circuit board 133. The plurality of LED lights 135 are configured to emit light to irradiate the substrate 11 in an environment with weak light or in a dark environment, so that the user can see the dialing numerals 120 on the substrate 11, and thereby make a dial-up call. Specifically, in order to facilitate the light emitted from the LED lights 135 to irradiate the substrate 11, the second housing 132 defines a plurality of light-transmitting holes 132b corresponding to the LED lights 135. The plurality of LED lights 135 emit the light, and then the light is irradiated into the substrate 11 through the light-transmitting holes 132b, so that the terminal device 100 can be still used in an environment with the weak or dark light to increase the scope of its application. The plurality of LED lights 135 may emit the same color of the light or emit different color of the light. For example, the plurality of LED lights 135 may emit white light, red light, or yellow light simultaneously. It should be understood that the number of the LED lights 135 can be set according to actual lighting requirements, such as two, three or more.

The microphone assembly 13 further includes a fixing frame 136, a third circuit board 137, and a vibrating element 138. The fixing frame 136 is fixed in the second housing 132. In the embodiment, in order to save an inner space of the second housing 132, the fixing frame 136 is substantially an arc frame, which corresponds to a shape of the second housing 132, and the fixing frame 136 is set on one side of the LED light 135. The fixing frame 136 is fixed to the second housing 132 by a screw, thus to ensure the tightness of the connection between the fixing frame 136 and the second housing 132.

The third circuit board 137 is fixedly set on an inclined plane of an inner portion of the second housing 132, and the third circuit board 137 is electrically connected with the second circuit board 133 through a bent flexible circuit board 137a. The third circuit board 137 is more inclined than the second circuit board 133, that is, an inclination degree of the third circuit board 137 relative to the first circuit board 125 is greater than an inclination degree of the second circuit board 133 relative to the first circuit board 125. It may also be said that an angle formed between the third circuit board 137 and the first circuit board 125 is greater than an angle formed between the second circuit board 133 and the first circuit board 125. In the embodiment, the third circuit board 137 is electrically connected with the vibrating element 138, thereby to realize an electrical conduction of the vibrating element 138, and thereby alert the user. In addition, the second circuit board 133 and the third circuit board 137 are designed respectively to connect different electronic components, thus to reduce the interference between the electronic components. It should be understood that, in other embodiments, the third circuit board 137 may be omitted, if there is enough space to directly and electrically connect the vibrating element 138 with the second circuit board 133, that is, the flexible circuit board 137a can be omitted simultaneously, therefore, the whole structure of the microphone assembly 13 may be compact simultaneously, the assembly between components may be also reduced, and the production cost and the assembly cost may be reduced.

In addition, a communication module (not shown), a Bluetooth module (not shown), and a control module (not shown) are further set on the third circuit board 137. The communication module, the Bluetooth module and the control module are electrically connected together, and the communication module, the Bluetooth module, and the control module are electrically connected with the third circuit board 137. The communication module is electrically connected with the microphone 134 to realize a call function of the microphone 134. The Bluetooth module is configured to realize a Bluetooth function of the terminal device 100, therefore the terminal device 100 may transfer data to, or share the data with other terminal devices through the Bluetooth module. The control module is configured to control the communication module and the Bluetooth module to realize their respective functions.

The vibrating element 138 is fixedly set on the fixing frame 136. In the embodiment, the vibrating element 138 is fixedly set on a surface (a bottom surface of the fixing frame 136 in FIG. 7) of the fixing frame 136 away from an opening of the second housing 132, thus to save the occupied space of the vibrating element 138 in the second housing 132. Preferably, the vibrating element 138 is fixedly set on the fixing frame 136 by a screw, and then connected with the third circuit board 137 through a wire or a lead wire to realize conduction. A vibrating cavity of the vibrating element 138 is formed in the second housing 132. The fixing frame 136 covers the vibrating cavity. The fixing frame 136 also includes a buckle 136a. The buckle 136a includes a vertical connecting part 1361 and a horizontal hook 1362. The hook 1362 extends toward the earphone assembly 12 and abuts against the third circuit board 137, thus to position the third circuit board 137.

The microphone cover 131 can be detachably set on the microphone cavity 112. In the embodiment, the microphone cover 131 is substantially an arc-shaped plate corresponding to the shape of the microphone cavity 112, and the microphone cover 131 is substantially an opaque plate, and the opaque plate shields the components in the microphone chamber 112. Preferably, in order to correspond to the substrate 11 and make the whole appearance effect of the main body 1 be better, the microphone cover 131 may be made from white plastic or coated a white layer on a surface of the microphone cover 131. The microphone cover 131 may be connected to the microphone cavity 112 by a screw, thus to ensure a tightness of its connection, therefore, the microphone cover 131 separated from the microphone cavity 112, causing the debris or dust entering into the microphone cavity 112 and generating an abnormal use between the microphone 134 and the second circuit board 133, may be avoided.

Furthermore, the microphone assembly 13 further includes a switch button 139 configured to control the terminal device 100 to be turned on or off, for example, control to unlock screen, lock screen, or turn on the terminal device, turn off the terminal device, or the like. The switch button 139 includes a switch portion 139a and a button portion 139b. The switch portion 139a is set on the second circuit board 133 and electrically connected with the second circuit board 133. The button portion 139b is set on the switch portion 139a. A groove 131a is set on the microphone cover 131 corresponding to the button portion 139b to expose the button portion 139b. The button portion 139b may be a silicone button, so that the user has a good hand feeling when the user presses the button portion 139b. In addition, the button portion 139b is substantially a round button, thus to facilitate a good appearance and decorative effect, and the decoration of the appearance of the terminal device 100 may be further enhanced.

For further improvement, at least one groove 14 is set on the substrate 11. The at least one groove 14 extends along a direction of the length of the substrate 11 and communicates with the earphone cavity 111 and the microphone cavity 112. The at least one groove 14 has a connecting wire 15 disposed therein. The connecting wire 15 is connected with the earphone assembly 12 and the microphone assembly 13. In the embodiment, because the substrate 11 is transparent and the whole shape of the substrate 11 is substantially an arc-shaped block, in order to prevent the connecting wire 15 between the earphone assembly 12 and the microphone assembly 13 from appearing on the substrate 11 and influence the whole appearance and decorative effect of the terminal device 100, the at least one groove 14 is set on the substrate 11, and the at least one groove 14 is set along edges of the substrate 11. Specifically, because four connecting wires 15 are required to be connected between the earphone assembly 12 and the microphone assembly 13, in order to prevent the connecting wires 15 from being concentrated in one of the grooves 14, which is easily viewed on the substrate 11, four grooves 14 are defined, and a width of each of the grooves 14 is designed to accommodate only one of the connecting wires 15. Preferably, the connecting wire 15 may be a silver wire or a copper wire with a diameter of 0.1 mm. Because the diameter of the connecting wire 15 is small, the user can ignore the connecting wire 15 when the user watches the terminal device, therefore, not only the appearance and decorative effect of the terminal device 100 is ensured, but also an electrical connection between the microphone assembly 13 and the earphone assembly 12 is ensured. It should be understood that, in other embodiments, the number of the groove 14 may be adjusted according to an actual connecting condition, such as two or three. It should be understood that, because the flexible touch panel 2 may conduct electricity, the flexible touch panel 2 may be configured as a conductive path of the microphone assembly 13 and the earphone assembly 12. Therefore, in some other embodiments, it is not necessary to provide the connecting wires.

The flexible touch panel 2 is a transparent touch panel. In the embodiment, because the substrate 11 is substantially an arc-shaped block structure, in order to correspond to a shape of the substrate 11, the flexible touch panel 2 may be bent to form an arc shape corresponding to the substrate 11. The flexible touch panel 2 is attached to the surface of the substrate 11 with dialing numerals 120, so that the dialing numerals 120 may be seen through the flexible touch panel 2, and then the flexible touch panel 2 may be touched to realize the dialing. Because both of the flexible touch panel 2 and the substrate 11 are transparent, the whole terminal device 100 looks like a transparent terminal device. Therefore, the appearance and decorative effect is better, and the user's experience is better. In addition, the flexible touch panel 2 is thin, so that the whole terminal device 100 may be made thin. At the same time, because the flexible touch panel 2 is a flexible screen, the flexible touch panel 2 may directly configured as a front cover of the terminal device 100 without a protecting housing, thereby an assembly of the terminal device 100 may be further simplified. Moreover, because the mechanical structure of the flexible touch panel 2 is simple, the flexible touch panel 2 is hard to be damaged during use, to ensure the normal use of the terminal device 100.

Furthermore, in order to protect a surface of the flexible touch panel 2 from damage or reduce fingerprints and dust on the surface of the flexible touch panel 2, the terminal device 100 further includes a protecting film 3 attached to the flexible touch panel 2 and covering the edge of the substrate 11, and exposing the earphone cover 121 and the microphone cover 131 simultaneously. Specifically, the protecting film 3 may be a tempered film, a matte film or the like, and the protecting film 3 is set according to a different need of the user.

The terminal device 100 is provided in the embodiment of the present invention. The substrate 11 and the flexible touch panel 2 are set to allow the whole appearance of the terminal device 100 to be a transparent terminal device with the good appearance and decorative effect. At the same time, because the flexible touch panel 2 enables the user to perform the touching function, a failure problem of the button caused by pressing the button of the related art may be avoided, and thereby further ensure the reliability of the use of the terminal device 100. In addition, because the substrate 11 is thin, and the earphone assembly 12 is separated from the microphone assembly 13, the whole terminal device 100 is thin. Therefore, the terminal device 100 may have the characteristic of the excellent portability and improve user's experience.

Referring to FIGS. 1, 8 and 9 again, which are the schematic structural views of a pedestal 200 provided by an embodiment of the present invention. The pedestal 200 is configured to support the terminal device 100, thus to charge the terminal device 100.

Figure 8:
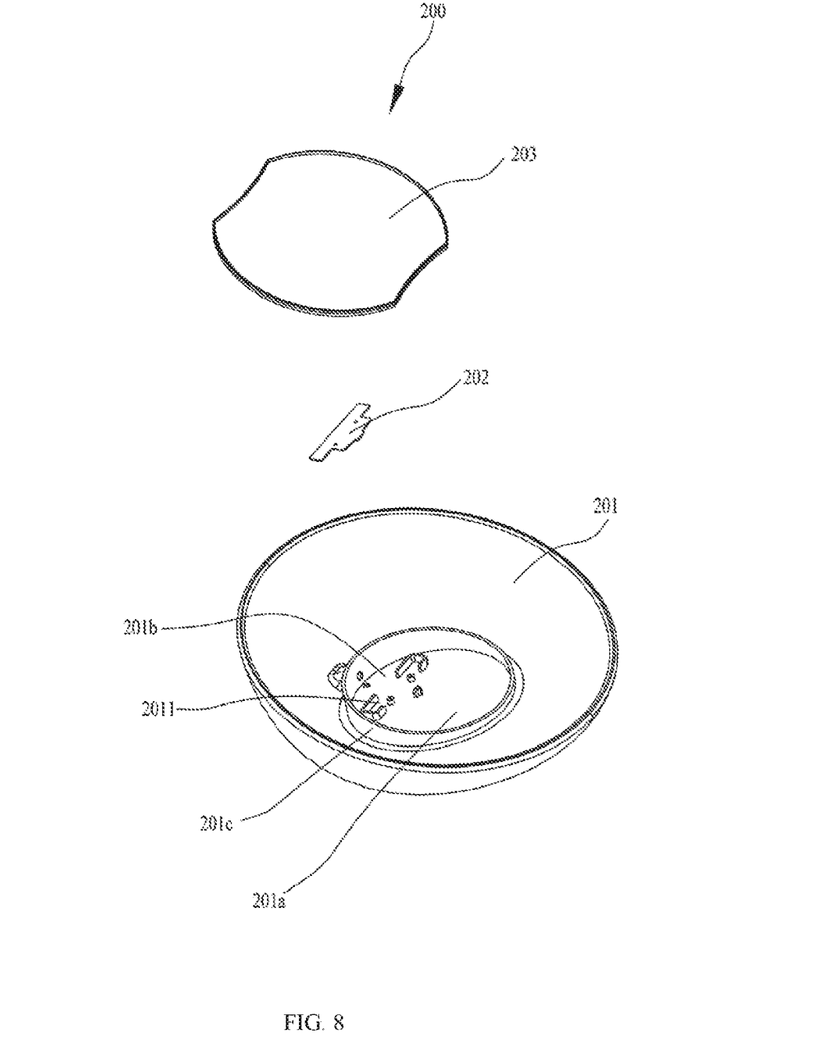
FIG. 8 is an exploded schematic view of a pedestal provided by an embodiment of the present application.
Figure 9:
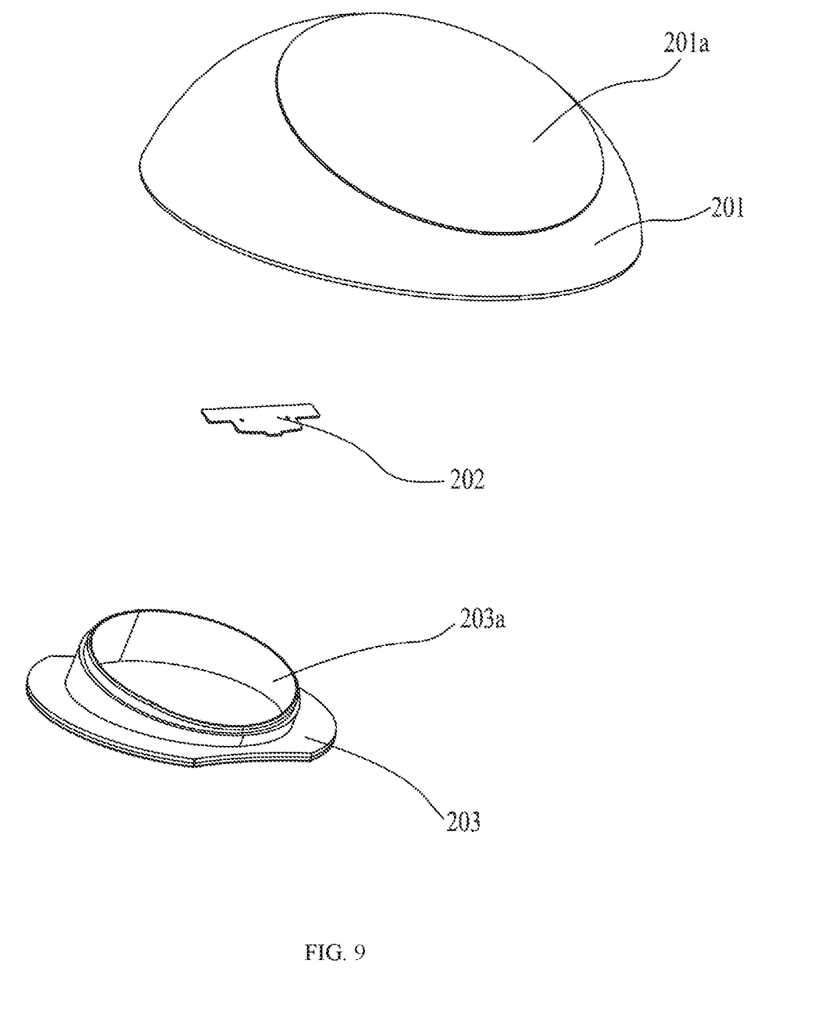
FIG. 9 is a schematic view of another perspective of FIG. 8.

Specifically, the pedestal 200 includes a pedestal body 201, a fourth circuit board 202 and a cover plate 203. The fourth circuit board 202 is set on the pedestal body 201. In the embodiment, in order to further enhance the appearance and decorative effect of the electronic device 1000 and facilitate the placement of the terminal device 100, the pedestal body 201 is substantially a bowl-shaped structure, and a bottom surface 201a of the pedestal body 201 is substantially planar, thus to place the pedestal body 201 conveniently on a desktop, a supporting column, or the like. In addition, in order to correspond to the appearance of the terminal device 100, the pedestal body 201 may also be made from transparent material, such as acrylic. Preferably, in order to reduce the whole quality of the electronic device 1000, the pedestal body 201 is substantially a hollow bowl-shaped structure, and one end of the pedestal body 201 is obliquely set to increase a size of the bottom surface 201a of the pedestal body 201, thus to facilitate the placement and fixing of the pedestal body 201. It should be understood that, in other embodiments, the pedestal body 201 may further be other shapes, for example, a square block structure, a circular block structure, or the like.

The pedestal body 201 defines a receiving cavity 201b, and the fourth circuit board 202 is received in the receiving cavity 201b. In the embodiment, a circular boss 201c is set in the pedestal body 201, the circular boss 201c defines the receiving cavity 201b, and a supporting member 201l is set in the receiving cavity 201b. The fourth circuit board 202 is clamped in the supporting member 201l to facilitate disassembly. It should be understood that, in other embodiments, the fourth circuit board 202 may also be fixed on the supporting member 201l by a screw.

The cover plate 203 covers the receiving cavity 201b and encloses an opening of the receiving cavity 201b. In the embodiment, when the pedestal body 201 is made from transparent material, the cover plate 203 is made from non-transparent material to prevent the user from seeing the connecting wires in the receiving cavity 201b and a connection of the electronic components, and thereby improve the whole decorative effect of the pedestal 200. The cover plate 203 is substantially a circular plate-like structure that corresponds to a shape of the receiving cavity 201b, and a central portion of the cover plate 203 is recessed to facilitate a subsequent placement of the terminal device 100. Therefore, when the terminal device 100 is placed on the cover plate 203, the substrate 11 with an arc structure may be completely contacted to the cover plate 203 to ensure the reliability of placement. It should be understood that, in other embodiments, the cover plate 203 may also be substantially a square plate structure, an arc plate structure, or the like.

Furthermore, a cylindrical boss 203a corresponding to a shape of the receiving cavity 201b is set on a surface of the cover plate 203 facing towards the receiving cavity 201b, and the cylindrical boss 203a is designed to be hollow. The cylindrical boss 203a has a screw thread configured to screw on the receiving cavity 201b, so that the cover plate 203 may cover the receiving cavity 201b. In addition, a screw connection enables the cover plate 203 to conveniently disassemble at any time, and then to check the connection of the fourth circuit board 202 to facilitate the overhaul and maintenance. It should be understood that, in other embodiments, the cover plate 203 may also be connected to the receiving cavity 201b by a buckle, or fixed to the receiving cavity 201b by a screw.

In order to enable the pedestal 200 to charge the terminal device 100, a charging module (not shown) is set on the fourth circuit board 202. The charging module is electrically connected with the fourth circuit board 202, thus to facilitate the charge of the terminal device 100. In the embodiment, in order to charge conveniently, the charging module may be a wireless charging module, a wireless sensing module (not shown) is set in the terminal device 100 corresponding to the wireless charging module. The wireless sensing module is inductively connected with the wireless charging module, to realize the charging. Specifically, the wireless sensing module is set on the second circuit board 125 of the terminal device 100 and electrically connected with the second circuit board 125. When the terminal device 100 needs to charge, only one side of the flexible touch panel 2 is placed on the cover plate 203, thus to realize inductive charging. Of course, the wireless sensing module can also be on the first circuit board 125 to reduce a distance of a current transmitting to the battery 123.

It should be understood that, in other embodiments, the charging module may also be a wired charging module, and a charging interface (not shown) is set on the pedestal body 201. The charging interface is electrically connected with the charging module. A socket (not shown) is set on the substrate 11 of the terminal device 100 corresponding to the charging interface, and the socket is connected with the charging interface through a charging cable. When the terminal device 100 is charged by the charging cable, the terminal device 100 may be placed on the cover plate 203 or separated from the cover plate 203 as long as the charging cable is connected with the charging interface and the socket.

In addition, in other embodiments, a charging-connection contact may also be set on the substrate 11, and then a charging contact may be correspondingly set on the pedestal body 201. When the charging-connection contact of the substrate 11 is abutted against the charging contact of the pedestal body 201, the substrate 11 may be charged by the pedestal 200.

The electronic device 1000 is provided by the embodiment of the present invention. The terminal device 100 is charged through the pedestal 200. Therefore, the terminal device 100 may not require an additional charger, thus to save component and cost. In addition, because the pedestal 200 and the terminal device 100 adopt a wireless charging manner, thus to charge the terminal device 100 conveniently, and improve the user's experience.

The terminal device 100 and the electronic device 1000 are provided by the present invention. The flexible touch panel 2 is set on the substrate 11 to realize the touch function during using by a user, so that a means using a mechanical button of related art may be replaced, a problem that the button is pressed in a long term causing damage can be avoided, and the reliability of the terminal device 100 may be greatly improved. At the same time, because the whole substrate 11 is thin, and the earphone assembly 12 and the microphone assembly 13 are set respectively on both ends of the substrate 11, the communication may be realized simultaneously, the whole structural compactness of the terminal device 100 may be improved, and the whole thickness of the terminal device 100 may be reduced.

In the description of the present specification, the description with reference to "one embodiment", "some embodiments", "an example", "a specific example", "some examples", similar to "first embodiment", or the like may refer to the specific feature, structure, material, or characteristic including in at least one embodiment or example of the present invention, which are described in the embodiments or examples. In the specification, the schematic representation of the above terms does not necessarily refer to the same embodiment or example. Furthermore, the specific feature, structure, material, or characteristic described in any one or more embodiments or examples may be combined in any suitable manner.

The above embodiments do not limit the protection scope of the technical solutions. Any modification, equivalent replacement and improvement made in the spirit and principle of the above embodiments should be included in the protection scope of the technical solution.

What is claimed is:

1. A terminal device, comprising:
   a main body comprising a substrate, an earphone assembly and a microphone assembly, wherein the earphone assembly and the microphone assembly are respectively set on two opposite ends of the substrate; and
   a flexible touch panel set on the substrate, wherein the flexible touch panel is located between the earphone assembly and the microphone assembly, the flexible touch panel and the substrate are transparent, dialing numerals are fixedly arranged on a surface of the substrate, and the flexible touch panel is attached to the surface of the substrate with the dialing numerals.

2. The terminal device of the claim 1, wherein the substrate is integrally made from a single monolithic piece of transparent material.

3. The terminal device of the claim 1, wherein the substrate defines an earphone cavity and a microphone cavity opposite to the earphone cavity, the earphone assembly and the microphone assembly are respectively received in the earphone cavity and the microphone cavity.

4. The terminal device of the claim 1, wherein the earphone assembly comprises a first housing, a speaker, and a first circuit board, the first circuit board is mounted in the first housing, and the speaker is electrically connected with the first circuit board.

5. The terminal device of the claim 4, wherein the first housing defines a battery compartment, and the earphone assembly comprises a battery received in the battery compartment and a bracket, and the bracket fixes the battery in the battery compartment.

6. The terminal device of the claim 5, wherein the bracket comprises a cover plate clamping on an opening of the battery compartment and an elastic abutting part extending from the cover plate, the cover plate covers an end surface of the battery, and the elastic abutting part elastically abuts against a side surface of the battery adjacent to the end surface of the battery.

7. The electronic device of claim 5, wherein the first circuit board is set at one side of the battery compartment, or the first circuit board is directly fixed on the bracket.

8. The terminal device of the claim 4, wherein the microphone assembly comprises a second housing, a second circuit board, and a microphone, the second circuit board is fixed in the second housing, and the microphone is set on the second circuit board and electrically connected with the second circuit board.

9. The terminal device of the claim 8, wherein the microphone assembly further comprises a fixing frame and a vibrating element, the fixing frame is fixed in the second housing, and the vibrating element is fixed on the fixing frame.

10. The terminal device of the claim 8, wherein the microphone assembly further comprises a third circuit board, the third circuit board is electrically connected with the second circuit board, both of the second circuit board and the third circuit board are inclined relative to the first circuit board, an angle formed between the second circuit board and the first circuit board is substantially less than an angle formed between the third circuit board and the first circuit board.

11. The terminal device of the claim 8, wherein the microphone assembly further comprises an LED light, a position of the second housing corresponding to the LED light defines a light-transmitting hole, a light emitted by the LED light is irradiated into the substrate through the light-transmitting hole.

12. The terminal device of the claim 8, wherein the microphone assembly further comprises a switch button, the switch button comprises a button portion and a switch portion, the switch portion is set on the second circuit board and electrically connected with the second circuit board, and the button portion is set on the switch portion.

13. The terminal device of the claim 1, wherein the substrate defines at least one groove, the at least one groove extends along a length direction of the substrate, connecting wires are set in the at least one groove, and the connecting wires are connected with the earphone assembly and the microphone assembly.

14. The electronic device of claim 13, wherein the at least one groove is arranged along an edge of the substrate, and the at least one groove is located at an outer peripheral of the flexible touch panel.

15. The electronic device of claim 13, wherein each of the connecting wires corresponds to each of the at least one groove, and a width of each of the at least one groove is designed to accommodate only one of the connecting wires.

16. The electronic device of claim 13, wherein a diameter of each of the connecting wires is substantially 0.1 mm.

17. The terminal device of the claim 1, wherein the flexible touch panel is configured as a conductive path to electrically connect the microphone assembly with the earphone assembly.

18. The electronic device of claim 1, wherein the dialing numerals are arranged on the surface of the substrate by a laser engraving, or the dialing numerals are integrally formed on the surface of the substrate when the substrate is molded.

19. An electronic device, wherein the electronic device comprises a pedestal and a terminal device, and the terminal device is located on the pedestal; and wherein the terminal device comprises:
a main body comprising a substrate, an earphone assembly and a microphone assembly, wherein the earphone assembly and the microphone assembly are respectively set on two opposite ends of the substrate; and
a flexible touch panel set on the substrate, wherein the flexible touch panel is located between the earphone assembly and the microphone assembly, the flexible touch panel and the substrate are transparent, dialing numerals are fixedly arranged on a surface of the substrate, and the flexible touch panel is attached to the surface of the substrate with the dialing numerals.

20. The electronic device of claim 19, wherein the pedestal comprises a pedestal body, a fourth circuit board and a cover plate, the pedestal body defines a receiving cavity, and the fourth circuit board is received in the receiving cavity, the cover plate covers the receiving cavity and encloses an opening of the receiving cavity.

* * * * *